United States Patent [19]
Kelsey

[11] Patent Number: 5,095,082
[45] Date of Patent: Mar. 10, 1992

[54] POLYMERIZATION PROCESS EMPLOYING MIXTURE OF DIELS-ALDER ADDUCTS OF 4-VINYLCYCLOHEXENE AND CYCLOPENTADIENE

[75] Inventor: Donald R. Kelsey, Fulshear, Tex.

[73] Assignee: Shell Oil Company, Houston, Tex.

[21] Appl. No.: 712,296

[22] Filed: Jun. 10, 1991

[51] Int. Cl.$^5$ ............................................ C08F 236/20
[52] U.S. Cl. ...................................... 526/282; 526/75; 526/281; 526/133; 526/166; 526/308; 585/361
[58] Field of Search ................... 526/75, 76, 281, 282, 526/308, 133, 166; 585/361

[56] References Cited

FOREIGN PATENT DOCUMENTS

| 0226957 | 7/1987 | European Pat. Off. ............ 526/281 |
| 1227894 | 11/1966 | Fed. Rep. of Germany ...... 585/361 |
| 2241944 | 10/1987 | Japan ................................... 526/308 |
| 1068620 | 5/1967 | United Kingdom ................ 526/282 |

*Primary Examiner*—Fred Teskin

[57] ABSTRACT

A hard, infusible, crosslinked polymeric product free from detectable cyclopentadiene odor is obtained by contacting, under polymerization conditions, a mixture of Diels-Alder adducts of 4-vinylcyclohexene and cyclopentadiene and Diels-Alder oligomers of cyclopentadiene of at least 3 cyclopentadiene units with an olefin methathesis catalyst.

25 Claims, No Drawings

POLYMERIZATION PROCESS EMPLOYING MIXTURE OF DIELS-ALDER ADDUCTS OF 4-VINYLCYCLOHEXENE AND CYCLOPENTADIENE

FIELD OF THE INVENTION

The present invention relates to process for the production of polymer products derived from a vinylcyclohexene and cyclopentadiene. More particularly, the invention relates to the ring-opening or metathesis polymerization of a mixture of adducts of 4-vinylcyclohexene and cyclopentadiene, in the optional presence of other polycyclic olefin compounds.

BACKGROUND OF THE INVENTION

The production of thermoset polymers by the ring-opening or methathesis polymerization of cyclic olefins is well known in the art. Numerous patents and literature references, both U.S. and foreign, relate to the ring-opening polymerization of dicyclopentadiene in the presence of a variety of olefin metathesis catalyst systems. One such catalyst system is disclosed by Sjardijn et al, U.S. Pat. No. 4,810,762, wherein substituted phenolic tungsten halides are employed with triorganotin hydrides as a catalyst system. In copending U.S. patent application Ser. No. 278,101, filed Nov. 30, 1988, there is disclosed a catalyst system which comprises a phenol-treated tungsten salt such as the halide or oxyhalide combined with a tin or aluminum compound. Bulk polymerization of dicyclopentadiene in the presence of a catalyst system of this type is illustrated by U.S. Pat. No. 4,729,976.

The ring-opening polymerization of dicyclopentadiene and other cyclic unsaturated compounds finds particular application in reaction injection molding (RIM) processes where monomer solutions of the catalyst components are mixed and injected into a mold where polymerization takes place to form a solid, infusible polymeric product. However, the polymerization of dicyclopentadiene by such a process suffers from several disadvantages. If the polymerization is not virtually quantitative, there will be unreacted monomer in the thermoset product and the molded article will have a most undesirable odor. This odor greatly limits the applications in which the polymerized product can be used. A second difficulty arises from the relatively low and less than desirable glass transition temperature for the polymerized dicyclopentadiene product. A typical glass transition temperature (Tg) is in the 130° C. to 140° C. range. This glass transition temperature also serves to limit the applications for the polymerization product.

It is also known to copolymerize polycyclic polyolefinic monomers such as cyclopentadiene trimers, tetramers and higher adducts with other cycloolefins to obtain higher glass transition temperatures. In European Patent Application 313,838, there is disclosed a process of producing ring-opened polymerization products of higher glass transition temperature by polymerizing cycloolefin monomers such as norbornene or tetracyclododecene in the presence of from about 5% to about 45% of a resinous cycloolefin formed from cyclopentadiene trimers and higher oligomers which may also contain common olefins such as styrene, propylene, butadiene, vinylcyclohexene and isopentene. The resinous cycloolefins are produced by heating dicyclopentadiene in the optional presence of the more common olefin. The polymer products of the European Patent Application have relatively high glass transition temperatures, at times over 210° C., but are difficult to prepare. Lane et al, U.S. Pat. No. 4,899,005, use as feed for a ring-opening polymerization mixture of polycyclic olefins which may also contain small amounts, i.e., less than 20% of α-olefins such as 1-hexene, styrene and vinylcyclohexene. Numerous other patent references illustrate ring-opening polymerization processes involving other and frequently more complex cycloolefins. It would be of advantage to provide a process for the ring-opening polymerization of polycyclic olefin compounds which is easy and economical to operate and where the products have relatively high glass transition temperatures and no detectable dicyclopentadiene odor.

SUMMARY OF THE INVENTION

The present invention provides a process for the ring-opening polymerization of certain cyclopentadiene adducts in the optional presence of dicyclopentadiene to produce novel metathesis polymers of relatively high glass transition temperature and no detectable dicyclopentadiene odor. More particularly, the invention provides for polymerization of adducts of cyclopentadiene and 4-vinylcyclohexene in the optional presence of other polycyclic olefin compound such as dicyclopentadiene.

DESCRIPTION OF THE INVENTION

The process of the invention comprises the ring-opening polymerization of a mixture of cycloolefinic adducts containing a major proportion of Diels-Alder adducts of 4-vinylcyclohexene and cyclopentadiene and minor proportions of cyclopentadiene oligomers. Trace amounts of 4-vinylcyclohexene and dicyclopentadiene may also be present, but no substantial amount of these materials are present. This mixture, optionally in the presence of added polycyclic olefin compound such as dicyclopentadiene, is contacted with an olefin metathesis catalyst system to effect the ring-opening polymerization reaction. The polymer product is a hard, infusible polymeric product of relatively high glass transition temperature and no detectable dicyclopentadiene odor. The major component of the material to be polymerized according to the process of the invention is a mixture of Diels-Alder adducts of 4-vinylcyclohexene and cyclopentadiene. The adducts are produced by contacting at elevated temperature the 4-vinylcyclohexene and dicyclopentadiene as a cyclopentadiene source. Without wishing to be bound by any particular theory, it appears likely that under the elevated temperature of the process the dicyclopentadiene "cracks" or de-dimerizes to provide cyclopentadiene which undergoes Diels-Alder condensation with the 4-vinylcyclohexene. A number of adducts are produced which are illustrated by, but not limited to, the adducts of the following formulas:

 (I)

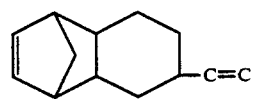 (II)

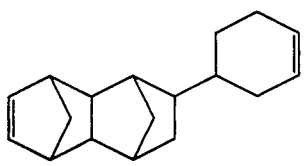

(III)

These particular adducts are known compounds produced by reaction of 4-vinylcyclohexene and dicyclopentadiene, typically in molar ratios greater than 10. To produce the major component of the mixture to be polymerized according to the process of the invention, it is preferred that the molar ratio of 4-vinylcyclohexene to dicyclopentadiene employed in adduct formation is from about 0.5 to about 6, more preferably from about 0.75 to about 4. The resulting adduct mixture to be polymerized contains substantial proportions of 1:1, 1:2 and 1:3 adducts as well as trimers, tetramers, pentamers and higher oligomers of cyclopentadiene. The starting materials, 4-vinylcyclohexene and dicyclopentadiene, are substantially absent.

The 4-vinylcyclohexene is a known compound illustratively obtained by Diels-Alder dimerization of butadiene. The dicyclopentadiene source of cyclopentadiene is also well known and is often obtained as a by-product of olefin crackers. Dicyclopentadiene exists in an endo form and an exo form but most commercial cyclopentadiene is of the endo form. Either isomer, or mixtures of the isomers, is suitable in the present process. Particularly useful is a commercially available technical grade of dicyclopentadiene having a purity of about 83%–95%. This technical grade is easily processed by virtue of it being liquid at ambient temperature whereas pure endo-dicyclopentadiene melts at about 32° C. Because of the reactive character of the monomeric reactants and/or the adduct products, it is desirable that the adduct formation is conducted in an inert reaction environment and even traces of reactive materials such as oxygen are preferably excluded. On occasion, free radical scavengers are also usefully provided to the reaction mixture to prevent undesirable reaction. The adduct formation is accomplished at a reaction temperature above about 160° C. and preferably from about 180° C. to about 260° C. At these temperatures the dicyclopentadiene undergoes a reverse Diels-Alder reaction to yield cyclopentadiene which reacts in situ with the 4-vinylcyclohexene to produce adducts of the types illustrated by the formulas I-III for 1:1 and 1:2 molar adducts.

The reaction time should be chosen to provide an adduct mixture of moderate viscosity, particularly when the adduct mixture is to be employed in a RIM polymerization process. Preferably, the viscosity of the adduct mixture should be lower than about 1000 cps. Reaction times up to about 5 hours are useful in providing mixtures of this viscosity when reaction temperatures of about 240° C. are used.

Although the use of a reaction diluent is not precluded, the preferred adduct formation is conducted in the substantial absence of reaction diluent. Subsequent to reaction the adduct mixture is purified to remove unreacted starting materials, any water or added free radical scavenger, and low molecular weight products by conventional methods such as treatment with molecular sieves or distillation at reduced pressure. The adduct mixture is not typically separated and is used substantially as produced in the ring-opening polymerization. The adduct mixture, as stated above, contains a major proportion of a variety of 1:1 adducts of 4-vinylcyclohexene and cyclopentadiene ($C_{13}H_{18}$), 1:2 adducts of 4-vinylcyclohexene and cyclopentadiene ($C_{18}H_{24}$), and 1:3 adducts ($C_{23}H_{30}$) as well as minor proportion of Diels-Alder oligomers of cyclopentadiene. An illustrative adduct mixture contains at least 50% by weight and preferably at least about 75% by weight of 4-vinylcyclohexene/cyclopentadiene Diels-Alder adducts. Although the proportion of the several adducts is variable, the 1:1 molar adducts comprise from about 30% by weight to about 90% by weight of these adducts, the 1:2 adducts from about 10% by weight to about 50% by weight of these adducts with 1:3 molar adducts comprising the remainder. The minor proportion of the adduct mixture to be polymerized is an oligomer mixture of cyclopentadiene oligomers of three or more cyclopentadiene units. Of this oligomer mixture, cyclopentadiene trimers are from about 30% by weight to about 95% by weight of the total oligomers, cyclopentadiene tetramers from about 5% by weight to about 50% by weight with the remainder comprising cyclopentadiene pentamers and higher oligomers. The weight ratio of adducts to cyclopentadiene oligomers ranges from about 1 to about 50 but preferably is from about 2 to about 25.

The adduct mixture as described above, in the optional presence of added polycyclic olefin compounds such as dicyclopentadiene, is subjected to a ring-opening or metathesis polymerization in the presence of an olefin metathesis catalyst system. A variety of olefin metathesis catalyst systems are known in the art and are usefully employed in the process of the invention. Pampus et al, U.S. Pat. No. 3,933,788, teaches the use of a tungsten salt, certain halogenated alcohols and an organoaluminum compound as metathesis catalyst. The process of Bassett et al, U.S. Pat. No. 4,861,848 employs as catalyst a tungsten halide substituted by at least 2 alkyl- or alkoxy-substituted phenoxide moieties. The above European Patent Application 313,838 teaches molybdenum and tungsten salts, particularly halides, employed in conjunction with alkylaluminum halides. Sjardijn et al, U.S. Pat. No. 4,810,762, use a catalyst system comprising a phenolic-substituted tungsten halide and a trialkyltin hydride. In copending U.S. patent application Ser. No. 278,101 filed Nov. 30, 1988, similar tungsten/tin catalyst systems are employed in conjunction with a boron halide promoter. These disclosures are incorporated herein by reference. The preferred olefin metathesis catalyst of the invention comprises a hexavalent tungsten halide with 0 or 1 oxygen substituent and two alkylphenoxy substitutents employed in conjunction with a triorganotin hydride and, optionally, a boron halide promoter. One class of such tungsten halides is represented by formula

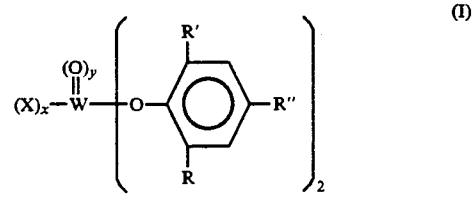

(I)

where R independently is alkyl of up to 10 carbon atoms inclusive preferably branched on the alpha carbon atom, R' independently is hydrogen or R and R" independently is hydrogen or R. The X group independently is halogen, i.e., fluoro, chloro, bromo or iodo, but is preferably a middle halogen chloro or bromo, x is 2 or 4 and y is 0 or 1 with the total of x+2y being 4.

In the above formula I, R is suitably methyl, ethyl, isopropyl, sec-butyl, t-butyl, t-amyl, 2-methyl-2-pentyl, 3-ethyl-3-hexyl, isobutyl, heptyl, octyl or decyl. R' is suitably hydrogen but is preferably R. A particularly suitable R" substituent is hydrogen. Illustrative phenoxy groups of the above formula include 2,6-diisopropylphenoxy, 2,6-di-sec-butylphenoxy, 2-t-butyl-6-t-amylphenoxy, 2,6-di-t-butyl-4-methylphenoxy, 2-isopropyl-4-ethylphenoxy and 2-t-butyl-4-hexylphenoxy. The preferred alkylphenoxy moiety of the above formula I is 2,6-diisopropylphenoxy.

The tungsten-containing catalyst system component will be a halide or an oxyhalide. Such components are di(phenoxy-substituted) tungsten tetrahalides or oxydihalides wherein each substituted phenoxy group is as described above. Particularly preferred catalyst components are the di(phenoxy-substituted)tungsten oxydichlorides.

The triorganotin hydride component of the preferred olefin metathesis catalyst system is a trialkyltin hydride or a triaryltin hydride wherein each alkyl or aryl independently has up to 10 carbon atoms. Illustrative of such tin hydrides are triethyltin hydride, triisopropyltin hydride, tributyltin hydride, trioctyltin hydride, dimethylethyltin hydride, ethylpropyloctyltin hydride, triphenyltin hydride, tritolyltin hydride and trixylyltin hydride. Trialkyltin hydrides are preferred, especially those wherein each alkyl is straight-chain lower alkyl of from 3 to 8 carbon atoms and particularly preferred as the trialkyltin hydride is tri-n-butyltin hydride. The di(phenoxysubstituted)tungsten halide and the triorganotin hydride are suitably employed in molar ratios from about 1:1 to about 1:15 but preferably in molar ratios from about 1:2 to about 1:8. The tungsten/tin-containing catalyst system is provided to the polymerization in a catalytic quantity. Quantities of the tungsten catalyst in an amount from about 0.001 mole % to about 5 mole % based on the adduct mixture are suitable. Quantities of tungsten catalyst from about 0.01 mole % to about 1 mole % on the same basis are preferred.

It is useful on occasion, although not required, to provide a boron halide promoter, e.g., boron trihalides, boron trihalide complexes or tetrahaloborates. Illustrative boron halides are boron trifluoride, boron tribromide, boron trifluoride diethyl ether complex, boron trifluoride dibutyl ether complex, tetrafluoroboric acid, triphenylmethyl fluoroborate, ammonium tetrafluoroborate, phenylboron dichloride, methylboron difluoride and boron trifluoride alcohol complexes. The preferred boron halides are boron trifluoride, the diethyl ether complex thereof and the dibutyl ether complex thereof. The boron halide promoter is not required in the reaction mixture but quantities up to about 10 moles per mole of tungsten catalyst are satisfactory. When boron halide promoter is employed, amounts of boron halide from about 0.05 mole to about 2 moles per mole of tungsten catalyst are preferred.

The ring-opening polymerization of the invention is preferably conducted by contacting the 4-vinylcyclohexene/cyclopentadiene adduct mixture, any additionally provided dicyclopentadiene, and a metathesis catalyst system at an elevated temperature. Added dicyclopentadiene is not required and is optional but no more dicyclopentadiene than about 20% by weight based on total adducts should be provided. It is on some occasions useful to provide a reaction diluent in part in order to solubilize the catalyst system components. In such an embodiment, one catalyst system component would be provided with each of two portions of the reaction diluent. The adduct mixture to be polymerized is suitably provided separately or with either portion. In the preferred modification, however, no added reaction diluent is employed and a portion of the adduct mixture is used to introduce each catalyst system component to the polymerization mixture. To effect the polymerization process, the 4-vinylcyclohexene/cyclopentadiene adduct mixture and the tungsten/tin catalyst system are contacted under polymerization conditions. Typical polymerization conditions include a polymerization temperature from about 25° C. to about 200° C. with polymerization temperatures from about 75° C. to about 160° C. being preferred and temperatures from about 100° C. to about 140° C. being most preferred. The polymerization pressure is that pressure required to maintain the reaction mixture in a non-gaseous state. Such pressures will vary with the reaction temperature but pressures up to about 5 atmospheres are typical and frequently ambient pressure is suitable and is preferred. The polymerization is preferably conducted in an inert environment with reactive materials such as water and oxygen being excluded.

In an illustrative polymerization, the reactants, and the catalyst system, and any materials such as fillers, reinforcements, antioxidants, stabilizers, pigments, elastomers or other materials supplied in order to influence the properties of the polymerization product are mixed at a relatively low temperature at which polymerization at a rapid rate does not occur. This relatively slow initial reaction rate permits efficient mixing or other processing of the reaction mixture. The polymerization mixture is then raised to polymerization temperature at least in part with the aid of a reaction exotherm which follows, and polymerization is rapidly complete.

A particularly contemplated embodiment of the polymerization process is in a reaction injection molding (RIM) process. Because of the initial relatively low viscosity of the polymerization mixture, a somewhat lower reaction exotherm and the length of time before the reaction exotherm occurs, the reaction mixture and catalyst system are mixed and transferred to a suitable mold, including those molds for large castings of intricate shapes and heated to polymerization temperature at a typical pressure of about 10-50 psi. In a typical RIM process, the time prior to the reaction exotherm is often about 2 minutes or less but once the polymerization is initiated as evidenced by the exotherm the polymerization process is quite rapid and is usually complete in a time from about 10 seconds to about 1 minute. Adduct mixtures characterized by lower viscosities lead to polymer products with somewhat lower glass transition temperatures, but such transition temperatures are still comparable to or higher than the glass transition temperature for polydicyclopentadiene.

The polymer product of the invention is a hard, highly cross-linked polymerization product of the 4-vinylcyclohexene/cyclopentadiene adduct mixture. The product is characterized by good mechanical properties, by a relatively high glass transition temperature and by the absence of detectable dicyclopentadiene odor.

The process of the invention provides polymer products of wider application than when dicyclopentadiene is polymerized in part because of the lower exotherm when the reactants and catalyst system are mixed. In bulk or adiabatic polymerization, dicyclopentadiene exotherms to about 180° C. to 210° C. whereas the monomer mixture of the present invention exhibits an exotherm temperature of about 140° C. to about 160° C. In the case of dicyclopentadiene polymerization, the heat transfer from thick portions of an article being molded is often inadequate during the exotherm and often the process causes the monomer to "boil" and form bubbles which weaken the part. If a lower polymerization temperature is used, the thin portions of the article are underpolymerized. The present process with a lower exotherm allows thicker articles to be molded as well as articles having greater variations in cross-section. The polymer is specifically useful in structural composites such as parts for automotive applications and electric and electronic applications such as circuit boards.

The invention is further illustrated by the following Illustrative Embodiments which should not be regarded as limiting.

Illustrative Embodiment I

To an autoclave of 100 ml capacity which had been degassed with argon were charged 10.8 g (0.1 mole) of 4-vinycyclohexene and 15.9 g (0.12 mole) of distilled dicyclopentadiene which contained a t-butylcatechol stabilizer. The autoclave and contents were heated to at least about 220° C. and maintained at the temperature for four hours as the internal pressure dropped from 90 psi to 33 psi. The autoclave and contents were then cooled and the product mixture washed from the autoclave with 30 ml cyclohexane. The resulting solution was filtered to remove a small amount of solid material and analyzed by gas-liquid chromatography. The solution was found to contain about 0.8% of light material, 19.2% 4-vinylcyclohexene, 1.6% exo-dicyclopentadiene, 1% endodicyclopentadiene, 26.3% of 1:1 adducts of 4-vinylcyclohexene and cyclopentadiene, 13.8% tricyclopentadiene, 22.7% 1:2 adducts of 4-vinylcyclohexene and cyclopentadiene, 6.7% tetracyclopentadiene, 5.3% 1:3 adducts of 4-vinylcyclohexene and cyclopentadiene. The cyclohexane solvent and unreacted vinylcyclohexene was removed by distillation to yield 21.0 g of a slightly cloudy, low viscosity liquid.

This reaction product was combined with the product of other preparations to give about 115 g of the product mixture which was dissolved in 96 ml of cyclohexane. The cyclohexene solution was passed through a column packed with Aldrich #30,632-0, an alumina adsorbent to remove t-butylcatechol and dried twice over 3Å molecular sieves. The cyclohexane solvent was removed by vacuum distillation (under 1 mbar pressure) to give 76 g of clear, viscous, pourable liquid which was dried over molecular sieves and degassed with argon. Analysis by gas chromatography of the final mixture showed it contained about 0.6% 4-vinylcyclohexene, 1.1% exo-dicyclopentadiene, 0.6% endo-dicyclopentadiene, 29.9% 1:1 adducts of 4-vinylcyclohexene and cyclopentadiene, 18.1% tricyclopentadiene, 25.9% 1:2 adducts of 4-vinylcyclohexene and cyclopentadiene, 10.6% tetracyclopentadiene, 8.6% of 1:3 adducts of 4-vinylcyclohexene and cyclopentadiene and 4.6% pentacyclopentadiene.

Illustrative Embodiment II

A 5 ml serum bottle was charged under nitrogen with 1.51 g of the final mixture of Illustrative Embodiment I and 0.0047 g (0.0074 mmol) of bis(2,6-diisopropylphenoxy)tungsten oxydichloride catalyst. The mixture was stirred and 0.0089 g (0.031 mmol) of tributyltin hydride was added. The reaction mixture was poured into an aluminum mold and then heated at 100° C. for 15 minutes to form a hard polymer. The molded part had no odor and the glass transition temperature of the polymer was determined to be 167° C. (by dynamic mechanical thermal analysis). Swelling and extraction in toluene at room temperature for 24 hours showed a swell of 143% and no detectable monomers by gas chromatography (using a $\beta$-pinene internal standard).

Illustrative Embodiment III

The procedure of Illustrative Embodiment II was repeated using 1.36 g of the final mixture of Illustrative Embodiment I, 0.09 g dicyclopentadiene, 0.0661 g of 7% solution of the bis(2,6-diisopropylphenoxy)tungsten oxidichloride (0.0073 mmol) in dry dicyclopentadiene (total dicyclopentadiene was 0.15 g) and 0.0088 g (0.030 mmol) tributyltin hydride. The polymer product has a glass transition temperature estimated to be between 162° C. and 177° C., a toluene swell of 152° C. and no detectable dicyclopentadiene or 4-vinylcyclohexene-cyclopentadiene adducts.

Illustrative Embodiment IV

To an electrically heated 300 ml Inconel autoclave was charged 120.5 g (1.11 mole) of 4-vinylcyclohexene and 0.062 g of 2,6-di-x-butyl-4-methylphenol antioxidant and the autoclave was then sealed, pressurized to 100 psig with nitrogen and heated to 240° C. A total of 95.5 g of dicyclopentadiene (containing 0.65 mole of dicyclopentadiene and 0.09 mole of 4-vinylcyclohexene) was pumped into the autoclave over a 2-hour period. Heating was continued for an additional 0.5 hour and the autoclave and contents were then cooled. The product mixture, 211.4 g, was removed from the autoclave and stripped at 50° C. and 1.9 mm for 7 hours to remove any unreacted 4-vinylcyclohexene. The adduct mixture had a viscosity of 17 cps at 32° C.

Illustrative Embodiment V

The procedure of Illustrative Embodiment IV was substantially repeated except that the molar ratio of 4-vinylcyclohexene to dicyclopentadiene was 3. The viscosity of the resulting adduct mixture was 11 cps at 32° C.

Illustrative Embodiment VI

The process of Illustrative Embodiment IV was substantially repeated except that the molar ratio of 4-vinylcyclohexene to dicyclopentadiene was 4. The viscosity of the resulting adduct mixture was less than 10 cps at 31° C.

Illustrative Embodiment VII

A polymerization process substantially similar to that of Illustrative Embodiment II was employed to polymerize a mixture of 1.5 g of 4-vinylcyclohexene/cyclopentadiene adducts. The catalyst system was formed from 0.0022 g of bis(2,6-diisopropylphenoxy)tungsten oxydichloride, 0.011 g of tributyltin hydride and 0.003 g of boron trifluoride dibutyl ether complex. The polymer product had a glass transition temperature of 159° C., a swell of 137% in toluene.

Illustrative Embodiment VIII

In a bulk polymerization of an adduct mixture similar to that of Illustrative Embodiment I, 16 g of the adduct mixture was mixed with a catalyst system comprising 0.059 mmole of bis(2,6-diisopropylphenoxy)tungsten oxydichloride and 0.237 mmole of tributyltin hydride. An exotherm occurred after 4.4 minutes and the temperature of the mixture rose to 137° C.

For purposes of comparison, when dicyclopentadiene was polymerized employing the same proportions of catalyst system components, the exotherm occurred after 3.1 minutes and the temperature of the mixture rose to 207° C.

Illustrative Embodiment IX

To one chamber of a plastic dual syringe was charged a solution of 0.116 g (0.186 mmole) of bis(2,6-diisopropylphenoxy)tungsten oxydichloride in 25 g of an adduct mixture in which the ratio of adduct to cyclopentadiene oligomer was 3.3. To the other chamber was charged a solution of 25 g of the same adduct mixture containing 0.215 g (0.739 mmole) of tributyltin hydride. Each chamber was sealed with a plastic plunger cap and the dual syringe was placed in a mixing assembly. A mixing tube approximately six inches long containing a static helical mixer was secured over the exit ports of the syringe chambers and the contents of the two chambers were simultaneously forced into the mixing tube, thereby mixing the solutions, and the resulting mixed solution was forced into a heated stainless steel mold which was preheated to 120° C. and under a nitrogen atmosphere. The mixing and mold-filling took approximately 30 seconds or less. Within about 1 minute after the mixture entered the mold, the mold temperature had risen about 3° C. and after about 5 minutes the mold was opened to yield a molded plaque approximately 4"×4"×⅛".

The glass transition temperature of the molded plaque was 147° C. (by dynamic mechanical thermal analysis) and 155° C. by rheometric measurements. The swell in toluene of the polymerized material was 144%. Extraction of a sample of the polymer showed 0.3% unreacted adduct mixture and no detectable dicyclopentadiene. Employing conventional test procedures, the polymer flexural modulus was found to be 448,000 psi and the flexural strength was found to be 12,400 psi.

What is claimed is:

1. A hard, infusible, crosslinked polymeric product obtained by contacting an adduct mixture comprising a major proportion of Diels-Alder adducts of 4-vinylcyclohexene and cyclopentadiene and a minor proportion of Diels-Alder oligomers of cyclopentadiene of at least 3 cyclopentadiene units, in the optional presence of added dicyclopentadiene, under polymerization conditions with an olefin metathesis catalyst system.

2. The product of claim 1 wherein the catalyst system comprises a di(alkyl-substituted phenoxy)tungsten halide, a triorganotin hydride and, optionally, a boron halide.

3. The product of claim 2 wherein the contacting is of the adduct mixture and the catalyst system and is at a temperature from about 25° C. to about 200° C.

4. The product of claim 3 wherein at least 50% by weight of the adduct mixture is Diels-Alder adducts of 4-vinylcyclohexene and cyclopentadiene.

5. The product of claim 4 wherein the adducts comprise from about 30% by weight to about 90% by weight of 1:1 adducts and from about 10% by weight to about 50% by weight of 1:2 adducts.

6. The product of claim 5 wherein the mixture of adducts is produced by contacting 4-vinylcyclohexene and dicyclopentadiene in a molar ratio of from about 0.5 to about 6 at a temperature above about 160° C.

7. The product of claim 6 wherein the tungsten halide is represented by the formula

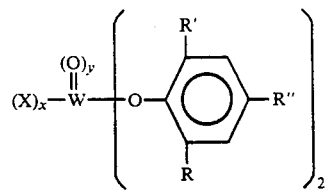

where R independently is alkyl of up to 10 carbon atoms inclusive, R' independently is hydrogen or R, R" independently is hydrogen or R, X independently is middle halogen, x is 2 or 4 and y is 0 or 1 with the sum of x+2y being 4.

8. The product of claim 7 wherein, in the triorganotin hydride is a trialkyltin hydride, each alkyl independently having up to 10 carbon atoms inclusive.

9. The product of claim 8 wherein the tungsten halide is bis(2,6-diisopropylphenoxy)tungsten oxydichloride and the tin hydride is tri-n-butyltin hydride.

10. In the process of producing a hard, infusible product by contacting polycyclic, polyolefinic compounds with an olefin metathesis catalyst under polymerization conditions, the improvement of employing as polycyclic, polyolefinic compounds an adduct mixture comprising a major proportion of Diels-Alder adducts of 4-vinylcyclohexene and cyclopentadiene and a minor proportion of Diels-Alder oligomers of cyclopentadiene of at least 3 cyclopentadiene units, in the optional presence of dicyclopentadiene.

11. The process of claim 10 wherein the adduct mixture is at least 50% by weight of the Diels-Alder adducts of 4-vinylcyclohexene and cyclopentadiene.

12. The process of claim 11 wherein the adducts comprise from about 30% by weight to about 90% by weight of 1:1 adducts and from about 10% by weight to about 50% by weight of 1:2 adducts.

13. The process of claim 12 wherein the mixture of adducts is produced by contacting 4-vinylcyclohexene and dicyclopentadiene in a molar ratio of from about 0.5 to about 6 at a temperature above about 160° C.

14. A process for the production of a hard, infusible product having no detectable dicyclopentadiene odor by contacting under polymerization conditions (1) an adduct mixture comprising a major proportion of Diels-Alder adducts of 4-vinylcyclohexene and cyclopentadiene and a minor proportion of Diels-Alder oligomers of cyclopentadiene of at least 3 cyclopentadiene units, and (2) an olefin metathesis catalyst.

15. The process of claim 14 wherein the contacting is at a temperature from about 25° C. to about 200° C.

16. The process of claim 15 wherein the adduct mixture contains at least about 50% by weight Diels-Alder adducts of which from about 30% by weight to about 90% by weight are 1:1 adducts and rom about 10% by weight to about 50% by weight are 1:2 adducts.

17. The process of claim 16 wherein the metathesis catalyst comprises a di(alkyl-substituted phenoxy)tungsten halide, a triorganotin hydride and, optionally, a boron halide promoter.

18. The process of claim 17 wherein the tungsten halide is represented by the formula

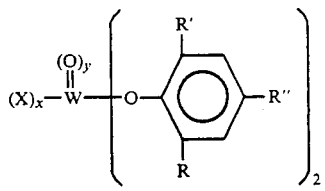

where R independently is alkyl of from 3 to 8 carbon atoms inclusive branched on the u-carbon atom, R is hydrogen or R, R" independently is hydrogen or alkyl of up to 10 carbon atoms inclusive, X independently is middle halogen, x is 2 or 4 and y is 0 or 1 with the sum of x+2y being 4.

19. The process of claim 18, wherein the triorganotin hydride is a trialkyltin hydride in which each alkyl independently has up to 10 carbon atoms inclusive.

20. The process of claim 19 wherein the Diels-Alder adducts are produced by contacting 4-vinylcyclohexene and dicyclopentadiene in a molar ratio from about 0.5 to about 6 at a temperature above about 160° C.

21. The process of claim 20 wherein the tungsten halide is bis(2,6-diisopropylphenoxy)tungsten oxydichloride and the tin hydride is tri-n-butyltin hydride.

22. The process of claim 19 wherein from about 0.05 mole to about 2 moles of boron halide are present per mole of the tungsten compound.

23. The process of claim 22 wherein the boron halide is boron trifluoride or boron trifluoride ether complex.

24. The process of claim 23 wherein the ether is dibutyl ether.

25. The process of claim 23 wherein the ether is diethyl ether.

* * * * *